US009650693B2

(12) United States Patent
Liu et al.

(10) Patent No.: US 9,650,693 B2
(45) Date of Patent: May 16, 2017

(54) METHOD FOR RECOVERING LEAD FROM LEAD-CONTAINING DISCARDED ELECTRONIC WASTE CATHODE RAY TUBE GLASS

(71) Applicant: GUANGDONG INSTITUTE OF ECO-ENVIRONMENT AND SOIL SCIENCES, Guangzhou, Guangdong (CN)

(72) Inventors: Chengshuai Liu, Guangzhou (CN); Xingwen Lu, Guangzhou (CN); Kaimin Shih, Guangzhou (CN); Fangbai Li, Guangzhou (CN)

(73) Assignee: GUANGDONG INSTITUTE OF ECO-ENVIRONMENTAL SCIENCE & TECHNOLOGY, Guangzhou, Guangdong (CN)

( * ) Notice: Subject to any disclaimer, the term of this patent is extended or adjusted under 35 U.S.C. 154(b) by 256 days.

(21) Appl. No.: 14/428,517

(22) PCT Filed: Oct. 17, 2012

(86) PCT No.: PCT/CN2012/083052
§ 371 (c)(1),
(2) Date: Mar. 16, 2015

(87) PCT Pub. No.: WO2014/040332
PCT Pub. Date: Mar. 20, 2014

(65) Prior Publication Data
US 2015/0232962 A1      Aug. 20, 2015

(30) Foreign Application Priority Data
Sep. 17, 2012   (CN) .......................... 2012 1 0345035

(51) Int. Cl.
*C22B 13/02* (2006.01)
*C22B 7/00* (2006.01)
*C22B 1/24* (2006.01)

(52) U.S. Cl.
CPC .............. *C22B 13/025* (2013.01); *C22B 1/24* (2013.01); *C22B 7/001* (2013.01)

(58) Field of Classification Search
CPC ............................ C22B 7/001; C22B 13/025
See application file for complete search history.

(56) References Cited

FOREIGN PATENT DOCUMENTS

| CN | 101817013 A | 9/2010 |
|---|---|---|
| CN | 102002593 A | 4/2011 |

(Continued)

OTHER PUBLICATIONS

Hironori, et al. JP 2012021176 A published Feb. 2012. Machine translation.*

(Continued)

*Primary Examiner* — George Wyszomierski
*Assistant Examiner* — Tima M McGuthry Banks
(74) *Attorney, Agent, or Firm* — Westerman, Hattori, Daniels & Adrian, LLP

(57) ABSTRACT

A method for recovering lead from lead-containing discarded electronic waste cathode ray tube glass includes the steps of taking a sample of cathode ray tube lead-containing funnel glass, crushing to obtain CRT glass powder, then uniformly mixing zero-valent iron powder with the CRT glass powder according to the mass ratio of 0.1-1.5:1, performing heat preservation at a temperature of 610-960° C. for 3-180 min, and further cooling to extract the metallic lead from a $SiO_2$ reticular glass structure of the CRT glass. This can be applied to pretreatment of the lead-containing waste CRT glass, and the metallic lead is extracted from the reticular silicate structure of the lead-containing waste CRT (Continued)

glass by adding the zero-valent iron in the thermal treatment process so that disposal rate of electronic wastes is improved and ecological safety is ensured. This method has important environmental, social and economic significance and broad application prospects.

6 Claims, 1 Drawing Sheet

(56) References Cited

FOREIGN PATENT DOCUMENTS

| CN | 102417989 A | | 4/2012 |
|---|---|---|---|
| CN | 102643994 A | | 8/2012 |
| CN | 102051487 B | * | 9/2012 |
| CN | 102660686 A | | 9/2012 |
| CN | 102676826 A | * | 9/2012 |
| JP | 2012-21176 A | | 2/2012 |
| JP | 2012021176 A | * | 2/2012 |

OTHER PUBLICATIONS

International Search Report dated Jun. 27, 2013, issued in corresponding application No. PCT/CN2012/083052.

* cited by examiner

US 9,650,693 B2

1

METHOD FOR RECOVERING LEAD FROM LEAD-CONTAINING DISCARDED ELECTRONIC WASTE CATHODE RAY TUBE GLASS

FIELD OF THE INVENTION

The invention belongs to the field of disposal and resource recycling of hazardous wastes and specifically relates to a method for recovering lead from lead-containing discarded electronic waste cathode ray tube glass.

BACKGROUND OF THE INVENTION

A cathode ray tube (CRT) is a display technology device which is earliest to realize industrial production and most widely applied, has the advantages of mature technology, high reliability, long service life and the like, and is taken as a main display device of televisions, computer displays, oscilloscopes and other electronic devices. At present, the social possessing capacity of the existing televisions in China exceeds 0.4 billion, wherein most of the televisions are CRT televisions, and the possessing capacity of the computer CRT displays has also exceeded 40 millions. With the rapid development of an electronic display device technology, the liquid crystal displays, due to the peculiar superiority thereof, seriously assault the market share of the CRT displays, so that the amount of the abandoned CRT displays is increased year by year. China has developed into a big country producing and consuming electronic products, and a large number of electronic products have entered a peak period of elimination and obsolescence. The 'old-for-new' policy for household electrical products had been promoted and implemented in China since Jun. 1, 2009, and a total of about 15 million waste electronic appliance products had been recovered up to the end of May, 2010, wherein the CRT televisions accounted for about 82%. About 12 million displays were recovered in total in 28 pilot provinces and cities in China, and almost all the displays were the CRT displays.

The lead-containing CRT glass in the waste CRT belongs to the hazardous waste and has become the focus of attention of treatment of the electronic wastes. At present, landfill is still taken as a main way for treatment and disposal of the waste CRT glass in part of countries or regions. However, when the CRT glass is present in a landfill field over time, heavy metal lead in the waste CRT glass will be dissolved out and enter groundwater and further bring serious harm to ecological environment and human health. In one report of US environmental protection agency, it is written that 98.7% of metallic lead in municipal solid wastes is from the electronic wastes, wherein 29.8% is from the waste CRT glass. Stephen, et al., adopted a solid waste TCLP (Toxicity Characteristic Leaching Procedure) recommended by US environmental protection agency to perform a leaching toxicity test on the lead in the waste CRT funnel glass, and found according to the results that the leaching concentration average value of the lead in the CRT funnel glass was about 75.3 mg/L, which was far beyond the identification standard for hazardous wastes. Thus, how to dispose and utilize a huge number of waste CRT displays has become a major challenge in the field of environmental protection in China and even all over the world.

At the same time, the CRT glass is an unignorable resource solid waste. It is estimated that the weight of the CRT glass which is currently used in the whole country is about 6 million tons, wherein the total lead content accounts for about 8.3%, reaching 0.5 million ton. At present, in the industry of smelting, raw materials for lead smelting mainly comprise lead sulfide ores, and the grade of the mined ores is lower than 3% generally; furthermore, the ores need to be subjected to ore dressing to obtain a lead concentrate, and then smelting is performed; and the lead grade in the colored CRT funnel glass is about 20 wt. %.

By comprehensively considering the factors in the aspects of resources, environment, technologies, economy and the like, resource recycling of the waste lead-containing CRT glass is a relatively reasonable disposal way. At present, the researches of lead extraction treatment methods for the waste CRT glass around the world are mainly focused on the following four types: (1) soaking and washing with acid and alkali solutions; (2) extracting the metallic lead by thermal treatment; (3) performing mechanical extraction; and (4) performing thermal treatment, washing, soaking and other steps for mixing. Wherein, by adopting the method of soaking and washing with acid and alkali solutions, the lead extraction efficiency is relatively low. According to a paper titled "Innovated Application of Mechanical Activation to Separate Lead from Scrap Cathode Ray Tube Funnel Glass" published in 2012 in Environmental Science & Technology (vol. 46, pp. 4109-4114), a strong acid soaking and washing method was adopted, but the achieved lead ion recovery rate was only 1.2% (by dissolving 0.5 g of CRT glass powder in 75 ml of 3 mol/l nitric acid solution and heating at 95° C. for 2 hours).

The methods for extracting the metallic lead by thermal treatment have been greatly researched, including the following three methods: thermal vacuum reduction with carbon, thermal reduction with SiC and TiN and high-temperature self-propagating evaporation treatment. According to the method of thermal vacuum reduction with carbon, carbon powder needs to be used as a reducing agent, and the metallic lead is extracted from a glass body by performing the thermal treatment process at the temperature of 1000° C. and low vacuum of 10-100 Pa for at least four hours. Due to the relatively high requirements for thermal treatment temperature and vacuum degree, such method is very difficult to realize large-scale industrial application. Relatively speaking, thermal reduction of the metallic lead with SiC and TiN from the CRT glass powder requires lower temperature (about 850° C.), but the extraction rate is also lower (<40%), and the reducing agents (SiC and TiN) adopted in such reduction method are expensive. By adopting the self-propagating high-temperature evaporation method for recovering the metallic lead, metallic Mg can spontaneously react with $Fe_2O_3$ to provide heat at the ultra-high temperature, thereby performing the self-propagating process. When the saturated vapor pressure of the metallic lead achieves the level for evaporation of the lead, the metallic lead can be evaporated from the glass body. Generally speaking, by adopting the method, the required temperature is about 2000° C., and the cost for extracting the metallic lead with the metallic Mg is also higher.

The mechanical extraction method taking $Na_2EDTA$ as an extracting agent requires longer extraction time (20 h) and higher consumption of the extracting agent $Na_2EDTA$. Another reported method is to perform sulfurization on the mechanically activated lead-containing CRT glass powder with elemental sulfur, but the sulfurization rate of the metallic lead has not been reported, and the final product of the method is PbS but not metallic lead.

Till now, the technical methods for recovering the lead from the lead-containing CRT glass waste require relatively high energy consumption to damage the 3-D glass structure embedded with the lead and further extract the metallic lead. This is because that lead atoms are included in the structure of $PbO_3$ polyhedrons and the $PbO_3$ polyhedrons are further firmly sealed by $SiO_4$ tetrahedrons to form a dense reticular glass structure. The lead content in the CRT funnel glass is higher than that in the lead ores, but the main difficulty is a lack of effective and feasible technology for extracting the lead from the glass with the reticular silicate structure. According to the current literature, it is found that the technologies for extracting the lead often require higher energy, expensive chemicals or complex extraction processes. Generally speaking, the temperature required for extracting the metallic lead from the $SiO_2$ reticular glass structure is higher than 1000° C.

SUMMARY OF THE INVENTION

The invention aims at providing a method for recovering lead from lead-containing discarded electronic waste electronic waste cathode ray tube glass with low cost, resource recycling and high recovery rate to overcome the problem that a large number of lead-containing CRT electronic wastes are produced at present.

According to the invention, a certain amount of zero-valent iron is mixed into lead-containing CRT glass powder, the glass structure around the lead in the glass is changed in the thermal treatment process, thereby realizing the extraction of the metallic lead at relatively low temperature, preventing the metallic lead from re-entering a glass matrix, and further realizing the purpose of the invention.

The method for recovering the lead from the lead-containing discarded electronic waste cathode ray tube glass of the invention, wherein comprising the following steps: taking lead-containing funnel glass as a sample, crushing to obtain CRT glass powder, then uniformly mixing zero-valent iron powder with the CRT glass powder according to the mass ratio of 0.1-1.5:1, performing heat preservation at the temperature of 610-960° C. for 3-180 min, and further cooling to extract the metallic lead from a $SiO_2$ reticular glass structure of the CRT glass.

The step of taking the lead-containing funnel glass as the sample and crushing to obtain the CRT glass powder comprises: breaking the funnel screen joint part of CRT, taking the lead-containing funnel glass, breaking till the particle size is 1-3 cm, then further crushing by a planetary ball mill till the particle size is less than 65 meshes, and drying at the temperature of 105° C. for 24 h to obtain the CRT glass powder for later use.

The temperature is preferably 610-910° C., and the heat preservation time is preferably 15-45 min.

As the glass transition temperature (Tg) of the lead-containing discarded electronic waste cathode ray tube glass is 505° C., when the thermal treatment temperature is higher than Tg, the lead-containing discarded electronic waste cathode ray tube glass becomes highly viscous liquid. The zero-valent iron and the extracted metallic lead are surrounded by the viscous glass liquid, thereby preventing oxygen in the air from further reacting with the metallic iron and lead in the thermal treatment process; and the described crystallization process is as shown in formula (1):

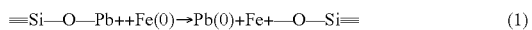

$$\equiv Si\text{—}O\text{—}Pb\text{+}+Fe(0) \rightarrow Pb(0)+Fe\text{+}\text{—}O\text{—}Si\equiv \quad (1)$$

Thus, too low temperature is not beneficial to extraction of the metallic lead, and too high temperature and too long thermal treatment time can cause the extracted metallic lead to return into the glass matrix. For extraction of the metallic lead, the optimal experimentation conditions are as follows: uniformly mixing the zero-valent iron powder with the CRT glass powder according to the mass ratio of 1.5:1, and then performing heat preservation at the temperature of 710° C. for 30 min, wherein under such conditions, at most 60% of lead element can be reduced from the cathode ray tube glass-$SiO_2$ reticular glass; and compared with the thermal treatment method for extracting the metallic lead from the same type of lead-containing CRT glass, the temperature is lowest, and the required time is shortest.

Compared with the technologies for extracting the metallic lead from the lead-containing CRT glass in the prior art, the invention has the following advantages:

1. According to the invention, when the thermal treatment temperature is higher than Tg, the lead-containing CRT glass can become the highly viscous liquid, and the zero-valent iron and the extracted metallic lead are surrounded by the viscous glass liquid, so that the reaction of the oxygen in the air with the metallic iron and lead in the thermal treatment process is inhibited, the lead is prevented from returning into the glass matrix, and the recovery rate of the lead is improved.

2. The invention adopts a sample input method, and a mixture of the lead-containing CRT glass and the zero-valent iron is directly put into an environment which has been heated to 610-960° C., so that the reducing agent iron is prevented from being oxidized by the oxygen in the air in the furnace heating process, and the reduction performance of the zero-valent iron is protected.

3. According to the invention, no toxic gas is produced in the thermal treatment process, atmospheric pollution is avoided, the involved reducing agent is the zero-valent iron which is an environment-friendly material and relatively cheap, secondary pollution can be avoided in the using process, and the invention is further suitable for large-scale popularization.

4. The method for recovering the lead from the lead-containing discarded electronic waste cathode ray tube glass of the invention is performed at normal pressure; and furthermore, the required temperature is low, the process is simple, the operation is simple and convenient, and the method is easy to perform large-scale production.

Thus, the invention can be applied to pretreatment of the lead-containing waste CRT glass, and the metallic lead is extracted from the reticular silicate structure of the lead-containing waste CRT glass by adding the zero-valent iron in the thermal treatment process, so that the disposal rate of electronic wastes is effectively improved, the ecological safety is ensured, and the invention has important environmental, social and economic significance and broad application prospects.

DETAILED DESCRIPTION OF THE INVENTION

Figure 1:
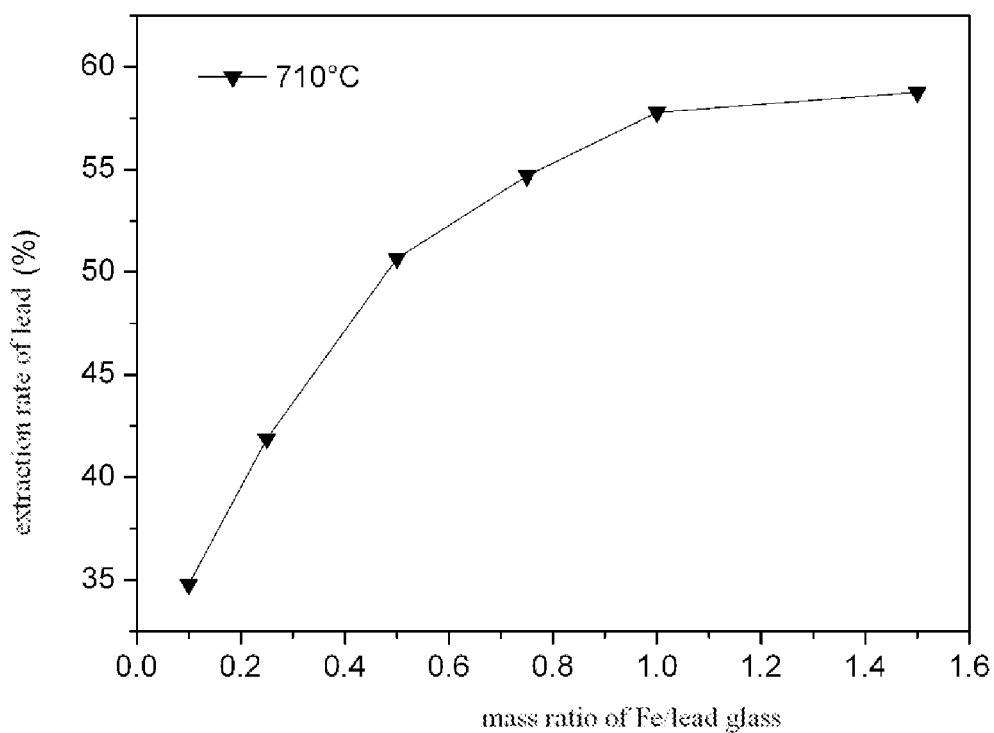
FIG. 1 shows effects of weight ratio of zero-valent iron powder/lead-containing CRT glass power on extraction rate of metallic lead when the temperature is 710° C. and the heat preservation time is 30 min.
Figure 2:
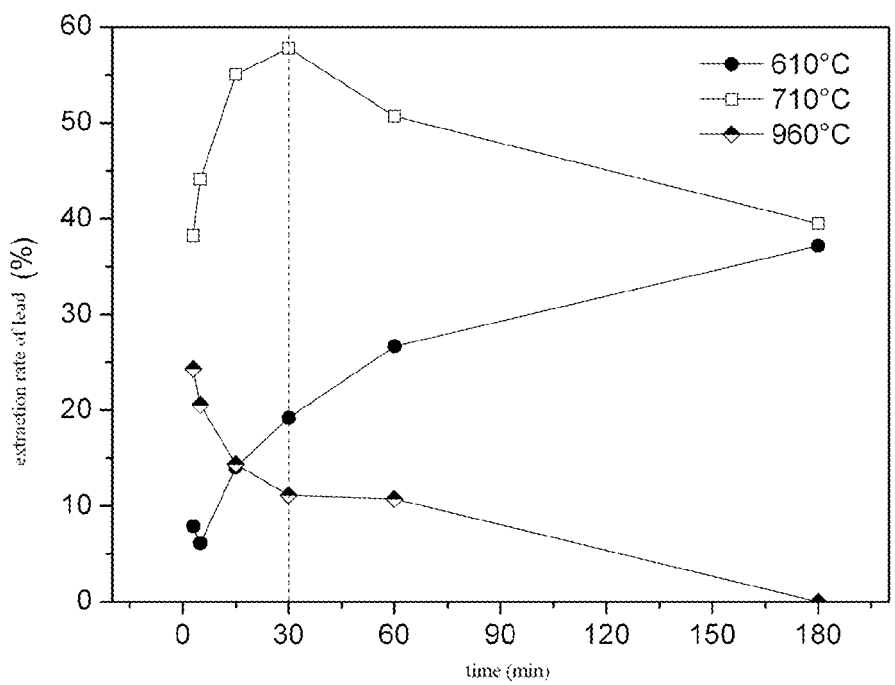
FIG. 2 shows effects of different thermal treatment time in the range of 3-180 min on extraction rate of metallic lead when weight ratio of zero-valent iron powder/lead-containing CRT glass power is 1/1 at three temperatures of 610° C., 710° C. and 960° C. respectively.

The following embodiments are used for further describing the invention rather than limiting the invention.

The method for recovering lead from lead-containing discarded electronic waste cathode ray tube glass of the invention comprises the following steps:

1. Preparation of lead-containing discarded electronic waste cathode ray tube glass powder and method for mixing lead-containing discarded electronic waste cathode ray tube glass powder with zero-valent iron powder The lead-containing discarded electronic waste cathode ray tube glass is waste colored display screen funnel glass with the lead content of about 20 wt. %.

(1) Break and separate the funnel screen joint part of the waste colored display screen CRT, and take the lead-containing funnel glass of the funnel part as a sample. Completely remove surface coating on the lead-containing funnel part glass by a wet washing method.

(2) Break the lead-containing funnel glass after removal of the surface coating, grind till the particle size is about 1-3 cm, and then perform further crushing by a planetary ball mill.

(3) Sieve the powder after crushing by a 65-mesh sieve, place the sieved powder (<65 meshes) into an oven at the temperature of 105° C., and dry for 24 h to obtain the CRT glass powder for later use.

(4) The purity of zero-valent iron powder which is used as a reducing agent is more than 99%, and the particle size is less than 80 meshes. The zero-valent iron powder is firstly in a sealed state and can be used immediately after being taken.

(5) Weigh the zero-valent iron powder and the CRT glass powder according to the mass ratio of 0.1-1.5:1 and perform ball milling for uniform mixing.

(6) Press the powder after mixing into cylindrical cakes with the diameter of 20 mm and the thickness of 5 mm at room temperature and the pressure of 650 MPa to ensure the close binding of the powder in the heating process and be conductive to thermal treatment reaction.

2. Input type thermal treatment of mixture of lead-containing CRT glass powder and zero-valent iron powder (1) Firstly place the compacted cylindrical cakes in the oven at the temperature of 105° C. for later use, and weigh and record each cylindrical cake which needs to be subjected to thermal treatment.

(2) Simultaneously place a corundum crucible in the oven at the temperature of 105° C. for later use. Place the weighed cylindrical cakes in the corundum crucible. and weigh again.

(3) Heat a muffle furnace to 610-960° C., preferably 610-910° C., stabilize, then put the corundum crucible containing the cylindrical cakes into the muffle furnace, and perform thermal treatment reaction for 3-180 min, preferably 15-45 min.

(4) When the reaction time is up to the target time, immediately take out the crucible with heat insulation gloves in conjunction with fireproof pliers, place in air, and naturally cool to room temperature.

(5) Weigh and record the weight of each of the cooled cylindrical cakes and the corundum crucible.

(6) Break the corundum crucible, take out the cylindrical cakes, grind into powder, and perform X-ray and X-ray fluorescence (XRF) analysis to analyze the lead extraction efficiency.

The metallic lead in the cylindrical cakes can be purified to obtain the elemental metallic lead by flotation, chemical extraction or other conventional ore dressing methods.

Embodiment 1: Effects of thermal treatment temperature on lead extraction efficiency The operation is performed by referring to the steps of the above method for recovering the lead from the lead-containing discarded electronic waste cathode ray tube glass, some parameters therein are changed or embodied but others are the same, and the specific steps are as follows:

Mix zero-valent iron powder and lead-containing CRT glass powder according to the mass ratio of 0.1:1 and 1.5:1, press into cylindrical cakes, and heat at the temperature of 500-960° C. (see Table 1) for 30 min. It can be seen from an X-ray diffraction spectrum that when the thermal treatment temperature is lower than 610° C., iron does not interact with the lead-containing glass, and only the iron is oxidized by oxygen in air. At the temperature of 610° C., the formation of a metallic lead phase is firstly observed. In addition, as the temperature rises, the signal of the metallic lead phase is significantly increased. At the temperature of 710° C., the highest formation rate of crystal lead is obtained, the thermal reduction reaction for extracting the lead from a lead-containing glass body by taking zero-valent iron as a reducing agent can be realized, and the described crystallization process is as shown in formula (1):

$$\equiv Si-O-Pb++Fe(0) \rightarrow Pb(0)+Fe+-O-Si\equiv \qquad (1)$$

As the temperature rises further, the signal strength of the metallic lead phase is not increased. Such phenomenon seems to indicate that the sharp drop in the signal strength of the metallic lead phase is caused by volatilization of the metallic lead and/or vitrification of the lead due to returning of the extracted metallic lead into a glass matrix.

TABLE 1

Effects of thermal treatment temperature on formation of metallic lead phase

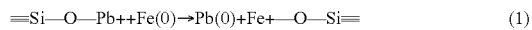

| Thermal treatment temperature (° C.) | The mass ratio of zero-valent iron/lead-containing CRT glass powder is 0.1:1 | The mass ratio of zero-valent iron/lead-containing CRT glass powder is 1.5:1 |
|---|---|---|
| 500 | 0 | 0 |
| 610 | 4.20 | 11.74 |
| 660 | 19.66 | 33.40 |
| 710 | 34.78 | 50.67 |
| 760 | 28.58 | 45.08 |
| 810 | 25.80 | 36.73 |
| 860 | 16.04 | 23.50 |
| 910 | 5.38 | 11.92 |
| 960 | 0 | 8.88 |

Embodiment 2: Determination of possibility of lead evaporation in experimental process The operation is performed by referring to the steps of the above method for recovering the lead from the lead-containing discarded electronic waste cathode ray tube glass, some parameters therein are changed or embodied but others are the same, and the specific steps are as follows:

In order to eliminate the possibility of lead evaporation in the experimental process, weight a sample in which the mass ratio of zero-valent iron powder to lead-containing CRT glass powder is 0.1:1, mix, press into cylindrical cakes, and further perform thermal treatment in the temperature range of 600-960° C. (see Table 2). Weigh the sample after thermal treatment, and perform X-ray fluorescence (XRF) inspection, wherein the weight and XRF data before and after the reaction of the sample are listed in Table 2. Calculate the loss of the lead by utilizing the weight and XRF data of the sample, wherein the lead loss at any temperature is less than 1 wt. %. The results show that the lead content in the initial sample is consistent with that in the sample after the corresponding thermal treatment. Thus, these findings confirm that no lead volatilization exists in the thermal treatment process. The comprehensive results in Embodiment 2 show that the crystal metallic lead extracted from the glass structure in the thermal treatment process can re-enter the glass matrix as the temperature rises. This embodiment indicates that the thermal treatment process has no lead volatilization effect and can not cause atmospheric pollution.

TABLE 2

XRF results of sample at different temperatures and calculation of lead loss

| Thermal treatment temperature (° C.) | XRF results (wt. %) | | Weight (g) | | Lead loss (%) |
|---|---|---|---|---|---|
| | PbO | Fe$_2$O$_3$ | Initial | Residual | |
| 600 | 20.69 | 13.24 | 3.47 | 3.48 | ND[a] |
| 650 | 19.76 | 13.67 | 4.21 | 4.33 | ND[a] |
| 700 | 19.31 | 12.25 | 3.98 | 4.15 | 0.38 |
| 750 | 19.26 | 12.56 | 4.31 | 4.62 | ND[a] |
| 800 | 18.72 | 13.13 | 3.68 | 4.07 | ND[a] |
| 850 | 18.97 | 13.79 | 4.23 | 4.47 | 0.78 |
| 900 | 19.86 | 13.84 | 3.69 | 3.84 | ND[a] |
| 960 | 19.66 | 13.44 | 3.87 | 4.04 | ND[a] |
| Original CRT | 20.23 | 12.11 | ~ | ~ | ~ |

[a]ND: Not detected

Embodiment 3: Effects of adding amount of zero-valent iron powder on lead extraction efficiency The operation is performed by referring to the steps of the above method for recovering the lead from the lead-containing discarded electronic waste cathode ray tube glass, some parameters therein are changed or embodied but others are the same, and the specific steps are as follows:

In order to optimize the process parameters, investigate the effects of the adding amount of the zero-valent iron powder on the lead extraction efficiency under the conditions that the temperature is 610° C., 710° C. and 960° C. respectively and the thermal treatment time is 30 min. The results are as shown in FIG. 1, the lead content is quantitatively analyzed by X-rays, and the lead extraction rate is effectively increased along with the increase of the zero-valent iron content in the sample. In addition, when the metallic lead is reduced under the condition that the mass ratio of zero-valent iron powder/lead-containing CRT glass powder is 1/1, the extraction rate of the metallic lead is the maximum. At the temperature of 610° C., when the mass ratio of zero-valent iron powder/lead-containing CRT glass powder is increased from 0.1/1 to 0.75/1, the lead recovery ratio is increased from 4% to 20%, and when the mass ratio of zero-valent iron powder/lead-containing CRT glass powder is in the range of 0.75/1-1.5/1, the lead extraction efficiency is relatively stable and consistent. At the temperature of 960° C., the results are similar, when the mass ratio of zero-valent iron powder/lead-containing CRT glass powder is increased from 0.1/1 to 0.75/1, the lead recovery ratio is increased from 0% to 11%, however, as the mass ratio of zero-valent iron powder/lead-containing CRT glass powder is further continuously increased, the lead extraction efficiency does not change correspondingly. At the temperature of 710° C., when the mass ratio of zero-valent iron powder/lead-containing CRT glass powder is increased from 0.1/1 to 1/1, the lead extraction rate is increased as the mass ratio of zero-valent iron powder/lead-containing CRT glass powder is increased, even if the mass ratio of zero-valent iron powder/lead-containing CRT glass powder is increased to 1.5/1, the highest lead extraction rate is stabilized at about 60%, and in the recovery process, when the mass ratio of zero-valent iron powder/lead-containing CRT glass powder is increased from 1/1 to 1.5/1, the lead extraction rate is only upgraded from 58% to 60%. Thus, in view of economics, it is recommended that the lead is extracted under the condition that the mass ratio of zero-valent iron powder/lead-containing CRT glass powder is 1/1.

Embodiment 4: Effects of thermal treatment time on lead extraction efficiency

The operation is performed by referring to the steps of the above method for recovering the lead from the lead-containing discarded electronic waste cathode ray tube glass, some parameters therein are changed or embodied but others are the same, and the specific steps are as follows:

In this embodiment, investigate the effects of thermal treatment time on the lead extraction efficiency. Prepare a mixture in which the mass ratio of zero-valent iron powder/lead-containing CRT glass powder is 1/1 into cylindrical cakes, and perform thermal treatment respectively at three temperatures of 610° C., 710° C. and 960° C. for different periods of time in the range of 3-180 min, wherein the results are as shown in Table 2. At the temperature of 610° C., through the thermal treatment effect in a long period of time of 180 min, the extraction rate of the metallic lead is increased to 35%. When the temperature is 710° C., from 3 min to 30 min, the lead extraction rate is directly proportional to the thermal treatment time, and when the thermal treatment holding time is increased from 30 min to 180 min, the lead extraction rate is reduced to 35%. When the thermal treatment temperature is 960° C., the lead extraction efficiency is inversely proportional to the thermal treatment holding time, the extraction rate of crystal lead rapidly reaches 25% within 3 min, and the extraction efficiency is reduced as the thermal treatment time is prolonged.

The results of this embodiment indicate that in the thermal treatment process, there are two mechanisms, namely lead extraction reaction as described in formula (1) and reaction for vitrifying the extracted metallic lead into the glass matrix, as shown in formula (2):

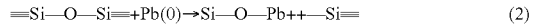

$$\equiv Si-O-Si\equiv +Pb(0) \rightarrow Si-O-Pb++-Si\equiv \quad (2)$$

The higher temperature and the longer thermal treatment time can further melt the glass, thereby vitrifying the metallic lead into the glass matrix and having great negative effects on extraction of the lead from the glass structure. The optimal experimental conditions are as follows: the mass ratio of zero-valent iron powder/lead-containing CRT glass powder is 1.5/1, the temperature is 710° C., and the thermal treatment is performed for 30 min.

The above descriptions are only preferable embodiments of the invention and not intended to limit the invention. Any modifications, equivalent substitutions, improvements and the like made within the spirit and the principle of the invention should fall within the protection scope of the invention.

The invention claimed is:

1. A method for recovering lead from lead-containing discarded electronic waste cathode ray tube (CRT) glass, comprising the steps of:
    taking a sample of cathode ray tube lead-containing funnel glass;
    crushing the sample to obtain CRT glass powder;
    preparing a mixture by mixing zero-valent iron powder with the CRT glass powder according to a mass ratio of 0.1-1.5:1;
    performing heat preservation of the mixture at a temperature of 610-960° C. for 3-180 min; and cooling the mixture to extract metallic lead from a $SiO_2$ reticular glass structure of the CRT glass.

2. The method according to claim 1, wherein the step of taking includes breaking a funnel screen joint part of the CRT and taking the sample of the cathode ray tube lead-containing funnel glass from the funnel screen joint part, and
wherein the step of crushing includes breaking the sample until the particle size is 1-3 cm, crushing by a planetary ball mill until the particle size is less than 65 meshes, and drying at a temperature of 105° C. for 24 h to obtain the CRT glass powder.

3. The method according to claim 1, wherein the temperature is 610-910° C.

4. The method according to claim 3, wherein the heat preservation is for 15-45 min.

5. The method according to claim 1, wherein the heat preservation is for 15-45 min.

6. The method according to claim 1, wherein the mass ratio of the zero-valent iron powder to the CRT glass powder is 1.5:1, the temperature is 710° C., and the heat preservation is for 30 min.

* * * * *